United States Patent
Wagner-Conrad et al.

(10) Patent No.: US 8,120,771 B2
(45) Date of Patent: Feb. 21, 2012

(54) CONFIGURATION OF A LASER SCANNING MICROSCOPE FOR RASTER IMAGE CORRELATION SPECTROSCOPY MEASUREMENT AND METHOD FOR CONDUCTING AND EVALUATING SUCH A MEASUREMENT

(75) Inventors: Stephan Wagner-Conrad, Jena (DE); Frank Hecht, Weimar (DE); Klaus Weisshart, Jena (DE); Ralf Netz, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 12/739,478

(22) PCT Filed: Sep. 30, 2008

(86) PCT No.: PCT/EP2008/008271
§ 371 (c)(1),
(2), (4) Date: Apr. 23, 2010

(87) PCT Pub. No.: WO2009/056205
PCT Pub. Date: May 7, 2009

(65) Prior Publication Data
US 2010/0225910 A1      Sep. 9, 2010

(30) Foreign Application Priority Data
Oct. 30, 2007   (DE) .......................... 10 2007 052 551

(51) Int. Cl.
*G01J 3/00* (2006.01)
(52) U.S. Cl. .............................. 356/300; 703/13; 703/12
(58) Field of Classification Search .................. 356/300; 703/11–13
See application file for complete search history.

(56) References Cited

U.S. PATENT DOCUMENTS
6,137,584 A    10/2000  Seidel et al.
(Continued)

FOREIGN PATENT DOCUMENTS
DE       198 20 575      12/1999
(Continued)

OTHER PUBLICATIONS

David L. Kolin et al., "Advances in Image Correlation Spectroscopy: Measuring Number Densities, Aggregation States, and Dynamics of Fluorescently labeled Macromolecules in Cells", Cell Biochemistry and Biophysics, Totowa, NJ, US, 2007, vol. 49, pp. 141-164.
(Continued)

*Primary Examiner* — Tarifur Chowdhury
*Assistant Examiner* — Abdullahi Nur
(74) *Attorney, Agent, or Firm* — Frommer Lawrence & Haug LLP

(57) ABSTRACT

By means of an improved configuration method, mathematical transport models can be fitted to correlations determined by means of scanning fluorescence spectroscopy with few errors. With improved methods for carrying out or evaluating a raster image correlation spectroscopy measurement (RICS) measurement, the amount of data to be stored can be reduced and RICS correlations of high statistical quality can be determined within a short period of time. For a raster image correlation spectroscopy measurement, a best value for a sampling value is determined and is specified for a subsequent scanning process on a sample. In order to carry out or evaluate a RICS measurement, sampling values are acquired or a correlation is determined exclusively in a sample region within which a pixel time ($\Delta P$) changes along a harmonically controlled scan axis (X) by less than, or at most by, a predetermined or predeterminable value.

30 Claims, 9 Drawing Sheets

U.S. PATENT DOCUMENTS

| | | |
|---|---|---|
| 6,317,258 B1 | 11/2001 | Watanabe |
| 2001/0054691 A1 * | 12/2001 | Park et al. .................. 250/309 |
| 2003/0151741 A1 | 8/2003 | Wolleschensky et al. |

FOREIGN PATENT DOCUMENTS

| | | |
|---|---|---|
| DE | 100 43 992 | 3/2002 |
| DE | 100 44 308 | 3/2002 |
| DE | 102 29 407 | 1/2004 |
| DE | 10 2004 034 979 | 2/2006 |
| DE | 10 2005 027 896 | 12/2006 |
| EP | 0 620 468 | 10/1994 |

OTHER PUBLICATIONS

Elke Haustein et al., "Fluorescence Correlation Spectroscopy: Novel Variations of an Established Technique", Annual Review of Biophysics and Biomolecular Structure, Annual Reviews Inc., Palo Alto, CA, US, 2007, vol. 36, pp. 161-169.

* cited by examiner

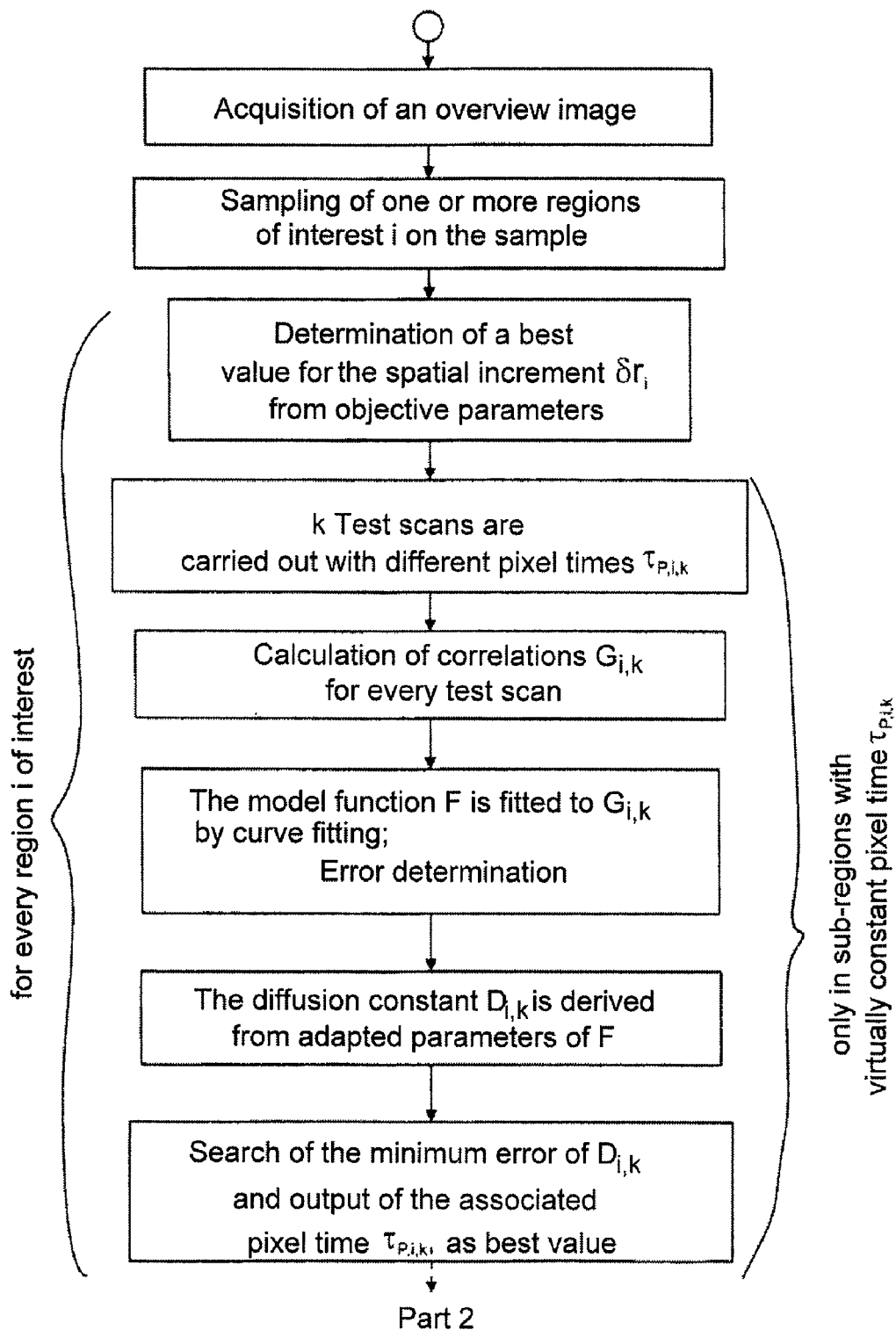
Fig. 8 - Part 1

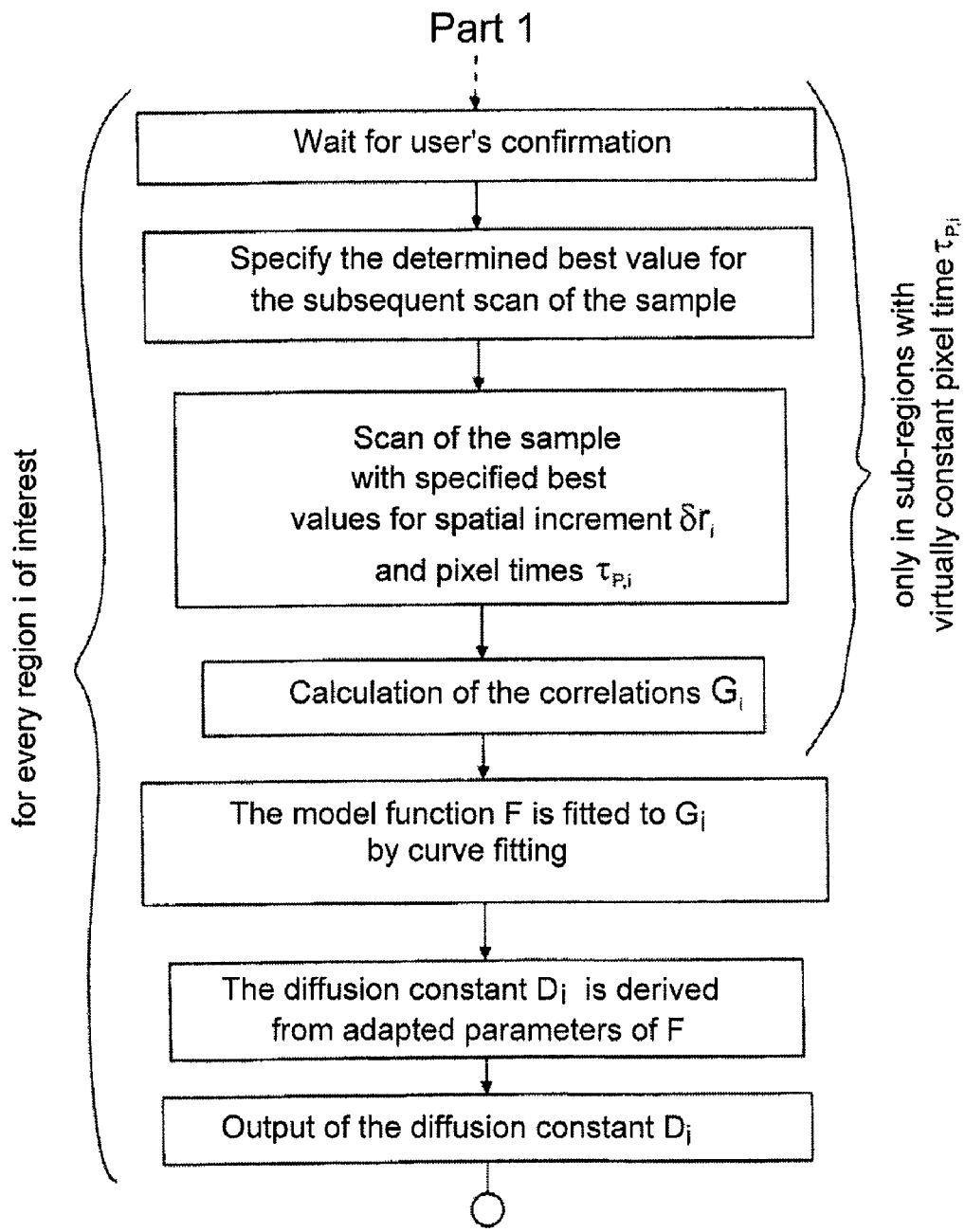
Fig. 8 - Part 2

CONFIGURATION OF A LASER SCANNING MICROSCOPE FOR RASTER IMAGE CORRELATION SPECTROSCOPY MEASUREMENT AND METHOD FOR CONDUCTING AND EVALUATING SUCH A MEASUREMENT

The present application claims priority from PCT Patent Application No. PCT/EP2008/008271 filed on Sep. 30, 2008, which claims priority from German Patent Application No. 10 2007 052 551.8 filed on Oct. 30, 2007, the disclosure of which is incorporated herein by reference in its entirety.

BACKGROUND OF THE INVENTION

1. Field of the Invention

The invention is directed to a method for the configuration a laser scanning microscope for a raster image correlation spectroscopy measurement and to a method for carrying out a raster image correlation spectroscopy measurement and for evaluating sampling values of a raster image correlation spectroscopy measurement. Further, the invention is directed to a correspondingly arranged control unit, a correspondingly arranged laser scanning microscope, and a correspondingly arranged computer program.

2. Description of Related Art

Fluorescence correlation spectroscopy (FCS) can be used to examine variable material concentrations in the microscopic size range which are brought about by diffusion processes and other transport processes in a sample. This makes it possible to observe physical and biological transport processes in an individual volume, or through an individual volume, with a diameter of about 200 nm. In order to make assertions about the transport processes in the sample, correlations with the fluorescence measurement data are determined and mathematical transport models are fitted to these correlations, for example, by means of curve fitting. In this way, diffusion constants, for example, can be determined from the adapted models. The transport models are typically mathematical functions whose parameters are adapted.

A spatial resolution of microscopic transport processes is achieved by means of scanning fluorescence correlation spectroscopy (S-FCS), also known as image correlation spectroscopy (ICS). In this way, temporal orders of magnitude from seconds to minutes can be tracked. Tracking which is spatially resolved in two or three dimensions within a cell or between membranes separated by cells within a time range from microseconds to milliseconds is made possible by raster image correlation spectroscopy (RICS). In this case, the sample is optically raster-scanned in two or three dimensions. A laser scanning microscope is advisably used for scanning correlation spectroscopy.

During the optical scanning movement in a RICS measurement, digital scan values (sampling values, samples) are acquired electronically along a first scan direction (scan line) at a typically constant sampling value recording frequency (sampling frequency). Every pixel value is determined from one or more sampling values. An interval within which a quantity of sampling values is associated with a determined pixel, or the period or frequency of such an interval, is designated as the pixel time. The scanning along the first scan direction is carried out repeatedly after moving the scanning beam along a second scan direction (scan column) so that a sequence of pixel lines is acquired. Intervals or periods of successive pixel lines are referred to as the line time. In case of a temporally nonlinear scanning movement along the first scan direction and a constant sampling frequency, the time increments are varied in the form of the pixel time for distortionless acquisition with constant spatial increments.

Errors in fitting the mathematical transport models to the correlations which are determined on the basis of the sampling values or pixel values depend directly on the suitability of the sampling values or pixel values derived therefrom for an evaluation of this kind. The suitability of the sampling values or pixel values in turn depends in a complicated manner on the size of the sample region to be examined, the density of the fluorescence markers in the sample, impurities in the sample medium with fluorescence markers, the scan frequencies and scan speeds, the optical properties of the microscope, the type of scanning movement, the illumination intensity, and the sensitivity of the detectors. The expression 'suitability' comprehends statistical and systematic error sources.

SUMMARY OF THE INVENTION

Therefore, it is the object of the invention to provide methods and devices of the type mentioned in the beginning by which mathematical transport models can be fitted to correlations determined by scanning fluorescence spectroscopy with a low error.

This object is met by methods and arrangements having the features indicated in the claims.

Advantageous embodiments of the invention are indicated in the dependent claims.

According to the invention, in a method for the configuration of a laser scanning microscope for a raster image correlation spectroscopy measurement, a best value for a scan parameter is determined and is given for a subsequent scanning process on a sample. In particular, best values can be determined and given for a plurality of scan parameters.

Within the meaning of the invention, scan parameters are all of those quantities that can be set at the laser scanning microscope in a RICS measurement and that influence the scanning movement of a scanning device, or scanner, relative to the sample or the electronic acquisition of the light reflected or emitted by the sample.

Within the meaning of the invention, best value designates an individual value or a range of values in which it is possible to evaluate a RICS measurement with the least error or, within an interval, with the least errors. The evaluation can comprise, for example, the determination of pixel values from scan values and the determination of autocorrelations and cross-correlations and the subsequent adaptation by means of curve fitting. Prior to the evaluation, the sampling values or the pixel values can be suitably modified, for example, by filtering. If there are a plurality of local error minima, the best value can be made up of a plurality of individual values or value ranges. In that case, the best value can be given, for example, in the form of a list of choices.

In the following, a pixel value derived from one or more sampling values can always be used instead of a sampling value.

Manual setting of the scan parameters for a RICS measurement is complicated because the effects of setting a certain parameter are not apparent due to the complex interaction between the various parameters and also depend on the physical-technical properties of the microscope. For this reason in particular, the anticipated suitability of a measurement for an individual combination of settings of all of the parameters can only be roughly predicted. The automatic determination, according to the invention, of a best value for one or preferably more such parameters can substantially facilitate and accelerate preparation and configuration of a RICS measurement. In particular, the physical-technical characteristics and settings of the microscope can be taken into account with high accuracy. In this way, mathematical transport models can be fitted to correlations determined from the sampling values with a low error.

One or more of the following values are preferably used as scan parameters: spatial increment, scan speed, pixel time, line time, sampling frequency. By scan speed is meant the spatial velocity at which the scanning point or—when using illumination slit diaphragms and detection slit diaphragms instead of pinhole diaphragms—the scanning line (line scanning) moves over the sample. The above-mentioned quantities interact with each other so that a manual configuration requires a particularly extensive knowledge of the functioning of the microscope and of the scanning process and is therefore complicated. In particular, the use and optimization of these scan parameters makes possible a constant scan amplitude. To this end, the pixel time and line time, for example, are adjusted, according to the invention, exclusively by the scan speed, particularly by taking into account the sampling frequency.

In an advantageous embodiment form, the best value of the spatial increment is determined on the basis of a width of a point transfer function of the laser scanning microscope in such a way that the spatial increment is significantly smaller than the width of the point transfer function (PSF). This provides an optical oversampling. In this way, the attenuation of the RICS correlations can be kept low, which is tantamount to a high statistical quality and, therefore, a low error in subsequent function fitting. For example, the correlation in case of free diffusion in three spatial dimensions is given by:

$$G(\xi, \psi) = \exp\left(-\frac{(\xi^2 + \psi^2) \cdot \delta r^2}{\omega_0^2 \cdot \left(1 + \frac{4D\left(\frac{\tau_p \cdot \xi +}{\tau_L \cdot \psi}\right)}{\omega_0^2}\right)}\right) \cdot$$

$$\frac{\gamma}{N} \cdot \left(1 + \frac{4D\left(\frac{\tau_p \cdot \xi +}{\tau_L \psi}\right)}{\omega_0^2}\right)^{-1} \cdot \left(1 + \frac{4D\left(\frac{\tau_p \cdot \xi +}{\tau_L \psi}\right)}{\omega_z^2}\right)^{-1/2}$$

where $\xi$, $\psi$ are pixel coordinates, $\delta r$ is the spatial increment during scanning, $\tau_p$ is the pixel time, $\tau_L$ is the line time, D is the diffusion constant, $\omega_0$ and $\omega_z$ are the width of the PSF in lateral and axial direction, respectively, N is the quantity of fluorescing particles in the confocal volume, and $\gamma$ is a form factor which takes into account the shape of the confocal volume. When the spatial increment $\delta r$ is adjusted to be small in relation to the lateral width $\omega_0$ of the PSF, the exponential factor (scanning term) always remains on the order of magnitude around 1, which allows a high suitability of the sampling values for the evaluation.

The best value of the spatial increment is advisably determined based on at least one objective lens parameter and on a light wavelength to be used during the subsequent scanning. In this way, a high accuracy of the RICS evaluation can be achieved.

In a particularly preferred embodiment form, the best value is determined in that a plurality of test scans are carried out on the sample to be scanned subsequently using different test values for the scan parameter. This procedure can be carried out in an economical manner like a trial-and-error strategy.

In so doing, the best value can be determined by finding the minimum of the error, particularly the statistical error, of a target quantity, particularly in that a minimum of an error of a quantity characterizing a dynamic of a sample process is determined from the sampling values of the test scans. A correlation is preferably determined for determining the target quantity and its error for every test scan and a model function is fitted thereto. The target quantity can be an error-containing parameter of the model function or can at least be derived from such parameters.

A diffusion constant is advantageously used as a quantity characterizing the dynamic. Alternatively or in addition, the best value can be determined in that a maximum of a width of a correlation of a test scan is determined from the sampling values of the test scans. This can also be used as a measure of the statistical quality of the correlation with little effort.

In the test scans, the sample is advantageously scanned bidirectionally with a test value of the scan parameter to be optimized which differs in the forward direction and return direction. The quantity of test scans can be reduced in this way. Accordingly, the configuration can be carried out more quickly.

Embodiments in which the scanning is carried out in forward direction and return direction within the same scan line are particularly advantageous. In this way, sampling values can be acquired with two different pixel times in one scan line in the same line time without reducing the quantity of lines per direction. Three time parameters can already be checked with only one scan of the sample region to be scanned. This not only reduces the duration of illumination of the sample, but also allows a faster and more accurate configuration. When designed in this way, the method can also be used in line-shaped illumination and scanning by means of slit diaphragms. With this type of recording, a plurality of pixels located in the same scan column are acquired simultaneously. The pixel time has the same value for all of the pixels of the scan column. Accordingly, two pixel times can be checked in one test scan by means of a bidirectional scan along one scan line.

To determine the best value, a simulation of a transport process in the sample and/or a virtual test scan are carried out. The virtual test scans can be carried out, for example, based on a modeling of the sample to be examined and sampling values resulting therefrom or by changing actually measured sampling values to prevent damage to the sample by too frequent or too prolonged exposure. In particular, correlation data can be determined exclusively computationally by simulation based on a model, for example, a model of dynamic particle interactions. The exposure of the sample can accordingly be limited to the actual measuring process using the best value which was determined beforehand virtually.

In a preferred embodiment of the invention, a real electronic oversampling of the sample is carried out and at least one virtual test scan is carried out based on the oversampling in that the quantity of acquired sampling values for the virtual scan is subsequently varied computationally. This offers a handy possibility for determining the scan parameters of pixel time and line time with different values for test purposes and determining the value with the best suitability without having to carry out a real scan with these pixel times and/or line times. In particular, different values of the "spatial increment" scan parameter can be adjusted for test purposes in this way.

In an advantageous manner, a plurality of sampling values can be collected or omitted to vary the quantity of sampling values. This can be carried out at high speed and with high accuracy.

In an advantageous embodiment form, the sample region to be scanned is determined based on a user's geometric presets. The sample region to be scanned can comprise one or more contiguous zones, or a plurality of separate sample regions are treated in parallel. Each zone or sample region then has its own best values for the scan parameter or scan parameters. The geometric presets are preferably made graphically based on an overview image of the sample by selecting regions of interest (ROI) on the sample. Exclusively the specified zones/regions are then preferably scanned during the configuration and also in the RICS measurement. The RICS evaluation is carried out by correlation analysis, preferably including cross-correlation and also preferably exclusively in the regions of interest.

In embodiment forms of the kind mentioned above, the best value is preferably determined exclusively for, and exclusively on the basis of, sampling values or derived pixel values from the sample region to be scanned. This reduces the duration of the configuration process.

In special embodiments of the invention, the best value is outputted as a suggestion, and a confirmation of a user for the optimized value is determined prior to a subsequent scan process. This suggestion of the best value or of a region for the scan parameters allows the user to check and modify the best value before the actual measurement. The user interface advisably offers the possibility of setting the suggested best value by actuation for the subsequent scan process or selecting it from the suggested region.

According to the invention, for a method for evaluating sampling values of a raster image correlation spectroscopy measurement of a sample, a correlation is advantageously determined exclusively in a sample region within which a pixel time changes along a harmonically controlled scan axis by less than, or at most by, a predetermined or predeterminable value, particularly by 10%. In this way, RICS correlations of high statistical quality can be determined within a short period of time. In a corresponding manner, in a particular method for carrying out a raster image correlation spectroscopy measurement on a sample, sampling values are acquired exclusively in a sample region within which a pixel time changes along a harmonically controlled scan axis by less than, or at most by, a predetermined or predeterminable value, particularly by 10%. This reduces the amount of data to be stored. Sampling values outside the region with a virtually constant pixel time, i.e., sampling values whose associated pixels have a pixel time which varies by more than 10%, are not stored.

In a particular embodiment form, for a high suitability of the scan parameters sampling values can be determined exclusively in a plurality of scan regions within which the pixel time changes along the harmonically controlled scan axis by less than, or at most by, a predetermined or predeterminable value. In a corresponding manner, in a method for evaluating sampling values of a raster image correlation spectroscopy measurement of a sample, separate correlations are advantageously determined in a plurality of scan regions within which the pixel time changes along the harmonically controlled scan axis by less than, or at most by, a predetermined or predeterminable value. In so doing, the highest value for the deviations in the different scan regions can differ or be uniform, for example, no more than 10% in each region. The total correlation G is then a superposition of the individual correlations $G_i$ of the individual scan regions, for example:

$$G(\xi, \psi) = \sum_i G_i(\xi, \psi, \tau_{P,i})$$

$$G_i(\xi, \psi, \tau_{P,i}) = \exp\left(-\frac{(\xi^2 + \psi^2) \cdot \delta r^2}{\omega_0^2 \cdot \left(1 + \frac{4D\left(\frac{\tau_{p,i} \cdot \xi +}{\tau_L \cdot \psi}\right)}{\omega_0^2}\right)}\right) \cdot$$

$$\frac{\gamma}{N} \cdot \left(1 + \frac{4D\left(\frac{\tau_{p,i} \cdot \xi +}{\tau_L \psi}\right)}{\omega_0^2}\right)^{-1} \cdot \left(1 + \frac{4D\left(\frac{\tau_{p,i} \cdot \xi +}{\tau_L \psi}\right)}{\omega_z^2}\right)^{-1/2}$$

where $\xi$, $\psi$ are pixel coordinates, $\delta r$ is the spatial increment during scanning, $\tau_p$ is the pixel time, $\tau_L$ is the line time, D is the diffusion constant, $\omega_0$ and $\omega_z$ are the width of the PSF in lateral and axial direction, respectively, and $N_i$ is the quantity of fluorescing particles contained in the confocal volume.

According to the invention, the sample can preferably be optically and/or electronically oversampled for a high statistical quality of the correlations.

The sampling values are advantageously acquired by means of a laser scanning microscope. A correlation is advisably determined from sampling values of a raster image correlation spectroscopy measurement by means of a control unit of a laser scanning microscope.

The quantity of sampling values can preferably be changed by collecting or omitting for determining the correlation to simulate different scan parameters. The scan parameter can accordingly be varied according to the actual data acquisition taking into account the resulting suitability of the sampling values which can be achieved in this way for the correlation analysis and model analysis, particularly in one or more virtual test scans.

The invention also comprises a control unit for a laser scanning microscope which is programmed to carry out a method according to the invention, a laser scanning microscope with a control unit of this kind, and a computer program which is set up to carry out the method according to the invention.

BRIEF DESCRIPTION OF THE DRAWINGS

FIG. 8 a flow chart showing a method for configuration, data acquisition and evaluation.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity; many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Identical parts have the same reference numbers in all of the drawings.

Figure 1:
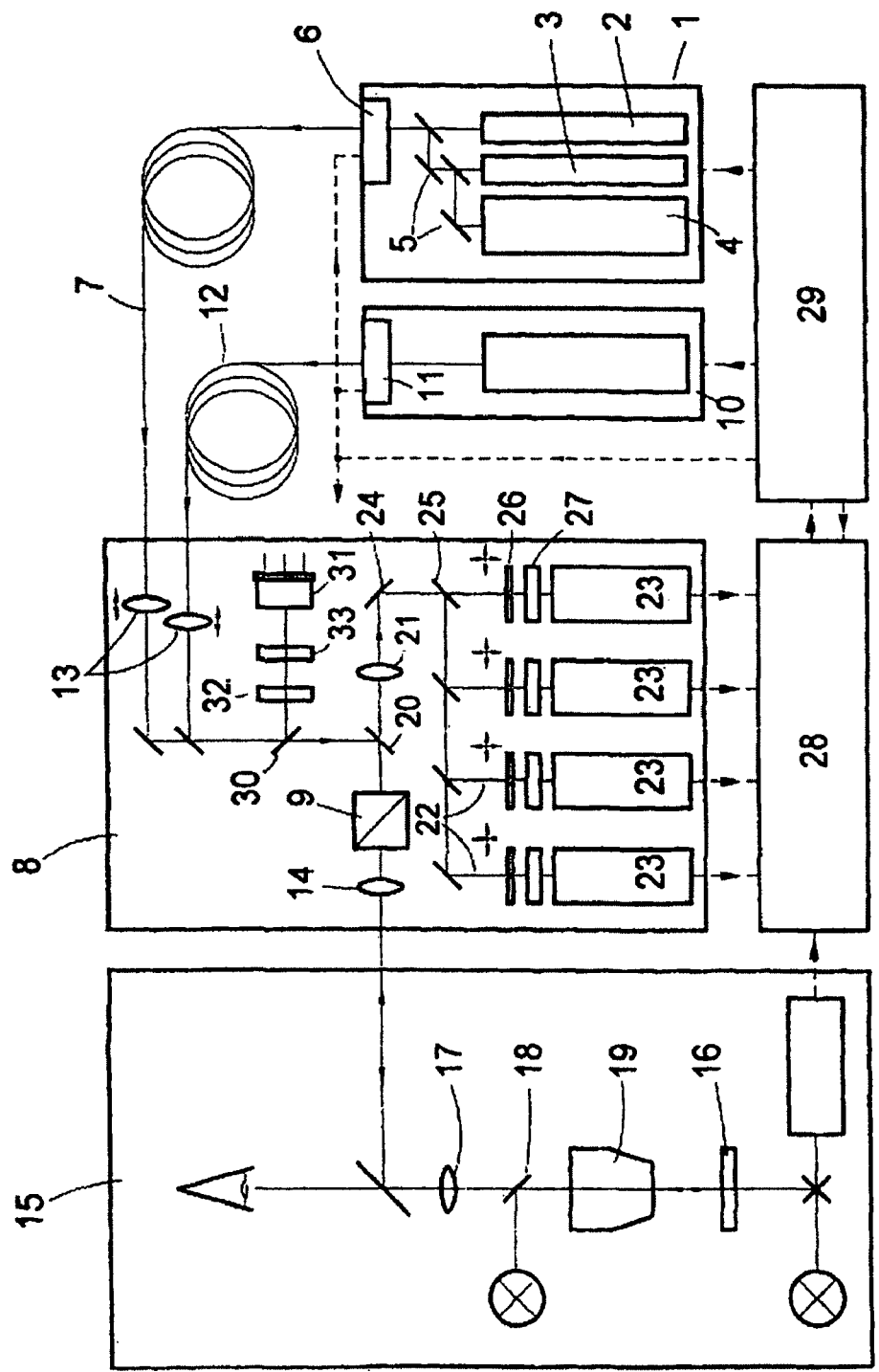
FIG. 1 a laser scanning microscope.

FIG. 1 shows, by way of example, a confocal laser scanning microscope which is particularly suitable for applying the method according to the invention. A laser module 1 is provided therein and is outfitted with lasers 2, 3 and 4 for generating laser light of wavelengths 633 nm, 543 nm and 488 nm, respectively, for the visible region. The radiation coming from the lasers 2, 3 and 4 is coupled by a plurality of beam combiners 5, an AOTF 6 and a light-conducting fiber 7 into a scanning device 8 which is outfitted with a unit 9 deflecting beams in coordinates X and Y. The scanning movement along the scan axis X can be carried out in the form of a harmonic oscillation or, for example, in the shape of a triangle. An UV laser whose light is coupled into the scanning device 8 via an AOTF 11 and a light-conducting fiber 12 is provided in a second laser module 10.

Arranged downstream of the light-conducting fibers 7 and 12 in both beam paths are collimating optics 13 whose distances from the respective fiber ends can be changed and which are coupled with a controllable adjusting device (not shown) for this purpose.

The laser radiation is coupled into the beam path of the microscope 15, shown in a simplified manner, by the beam-deflecting device 9 through a scan objective 14 and is directed in this instance onto a sample 16 which contains a fluorescent dye or to which such a dye has been applied. The laser radiation passes a tube lens 17, a beamsplitter 18 and the microscope objective 19 on the way to the sample.

The light reflected and/or emitted by the irradiated location on the sample travels back through the microscope objective 19 to the beam-deflecting device 9, then passes a beamsplitter 20 and, after splitting, is directed by means of the imaging optics 21 into a plurality of detection channels 22 to detectors 23 in the form of photomultipliers (PMT), each of which is associated with one of the detection channels 22. For the purpose of splitting into the individual detection channels 22, the light is directed, for example, by a deflecting prism 24 to dichroic beamsplitters 25. Pinholes 26 and emission filters 27 which are adjustable in direction of the radiation and also perpendicular thereto are provided in each detection channel 22.

The outputs of the detectors 23 lead to the signal inputs of an evaluating circuit 28 which is connected in turn to a control unit 29 for integrating and evaluating the signals of the detectors 23 pixel by pixel. The outputs of the control unit 29 are connected to the signal inputs of the laser modules 1 and 10, to the signal inputs of the adjusting devices for influencing the position of optical elements or assemblies, for example, the position of the collimating optics 13 and the pinholes 26, to the scanning device 8, and to the evaluating circuit 28 (not shown in detail). Further, the control unit 29 is connected to a display (not shown) and operating controls (not shown) for data entry and data modification.

For example, the laser radiation which is coupled into the scanning device 8 is branched by a beamsplitter 30. One of the branches is directed to an optoelectronic receiver 31 for monitoring the laser radiation. A plurality of line filters 32 and neutral filters 33 which are arranged on filter wheels and can be exchanged for one another by rotating the filter wheels are arranged in front of the optoelectronic receiver 31. The output of the receiver 31 is likewise at a signal input of the evaluation circuit 28. The filter wheels on which the line filters 32 and neutral filters 33 are arranged are coupled with adjusting devices whose control inputs are connected to signal outputs of the control unit 29 (not shown).

Of course, the method according to the invention can also be realized with laser scanning microscopes of considerably simpler construction.

Figure 2A:
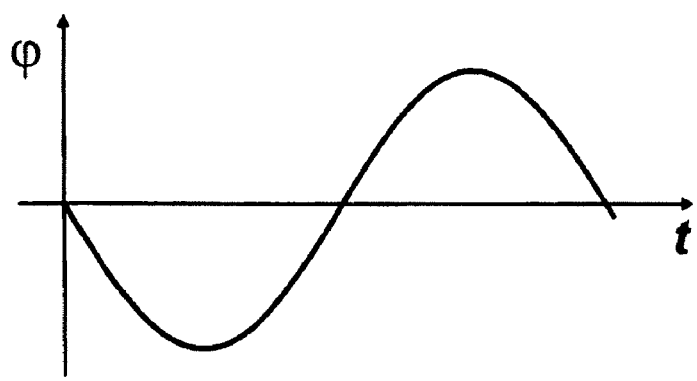
FIG. 2 graphs showing the scanning movements and pixel time.
Figure 2B:
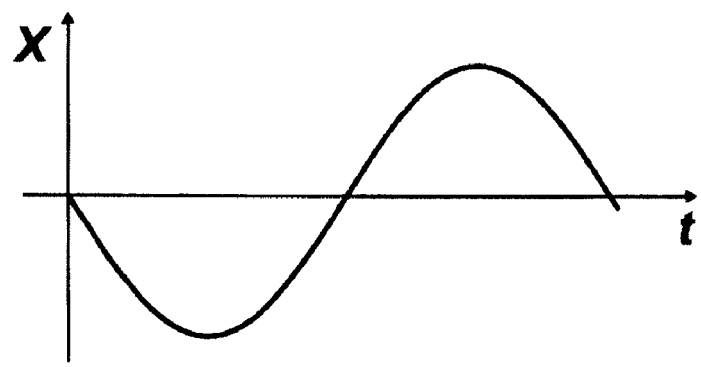
Figure 2C:
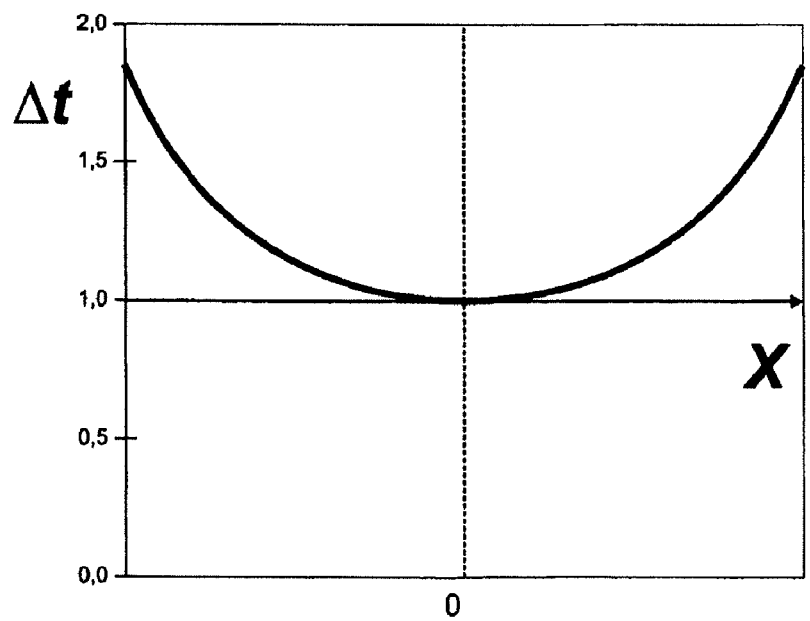

For a sinusoidal harmonic movement of one of the deflecting mirrors of the beam-deflecting unit 9, FIG. 2 shows the deflection angle $\phi$ of the respective deflecting mirror in FIG. 2A, the deflection X of the scanning beam on the sample 16 in FIG. 2B, and the spatially-dependent pixel time $\tau_P$ in FIG. 2C. The pixel time $\tau_P$ is the duration over which a signal of a photomultiplier 23 is integrated and averaged to form a sampling value for a respective pixel. Because of the harmonic movement, the pixel times $\tau_P$ at the outer edges of the scannable region are appreciably longer than in the center. The deflection X of the scan beam in the sample plane is expressed analytically by $x = f \cdot \tan[b \sin(\omega \cdot t)] \approx f \cdot b \cdot \sin(\omega \cdot t)$, where t is the time, b is the amplitude, and $\omega$ is the rotational frequency, and the approximation is applicable for small deflection angles. The spatial increment $\Delta X = \delta r$ is preferably kept constant in order to record undistorted images. This results in a changing time increment $\Delta t$ and pixel time $\tau_P$:

$$\Delta t = \tau_p \approx \Delta x \cdot f^{-1} \cdot b^{-1} \cdot \omega^{-1} \frac{1}{\cos(\omega \cdot t)}$$

Figure 3A:
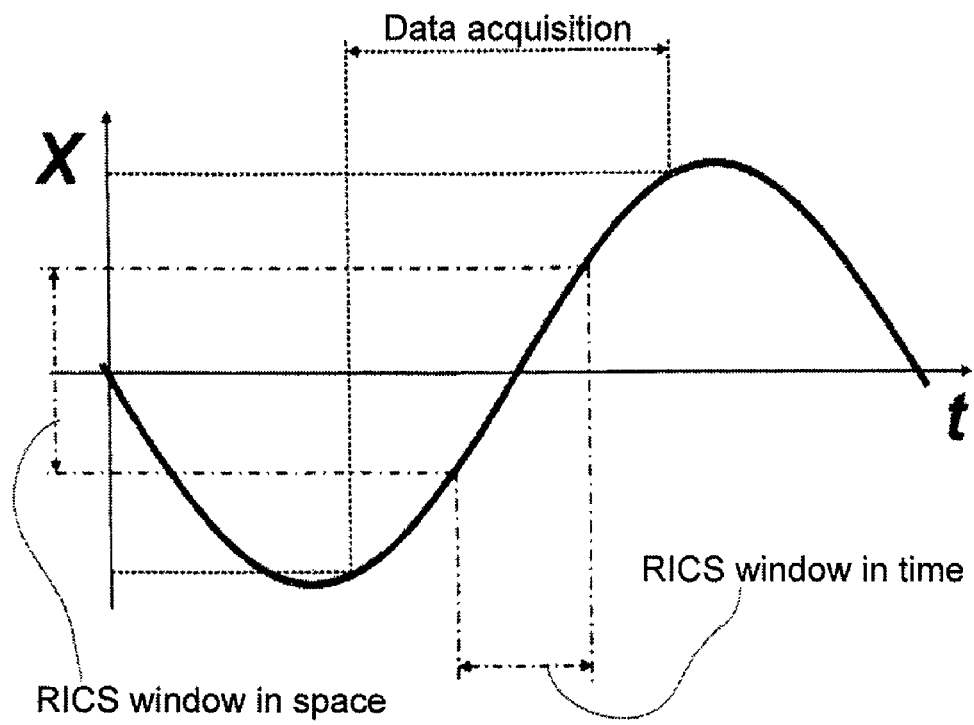
FIG. 3 the limitation of the data acquisition region and correlation region.
Figure 3B:
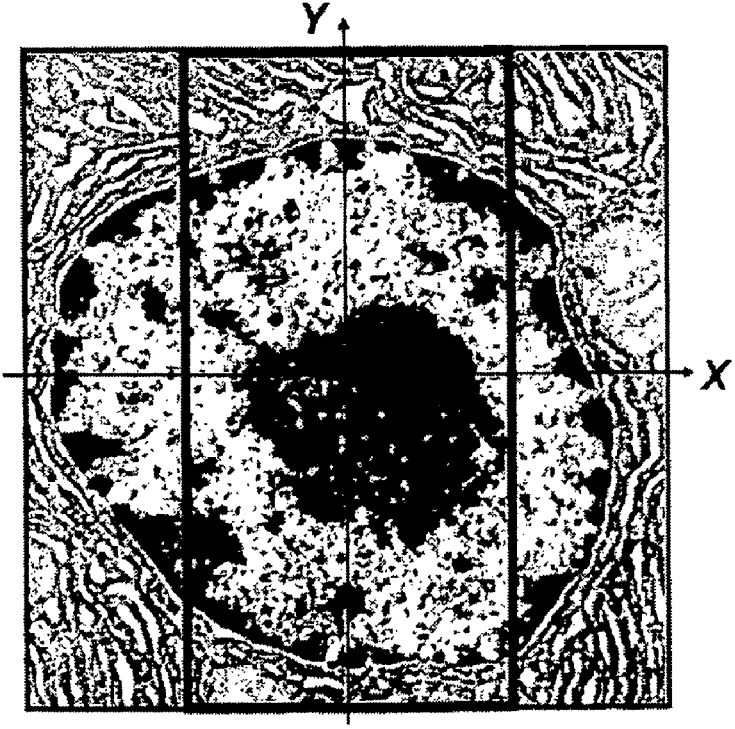

FIG. 3 shows the spatial limitation, according to the invention, of the data acquisition (sampling) in a RICS measurement with a harmonic scanning movement of the light beam along scan axis X and a linear scanning movement along scan axis Y. FIG. 3A shows the limitation in a deflection-time graph, FIG. 3B shows the limitation spatially in an image (X-Y diagram) of a sample taken by way of example. In order to apply model functions, based on an assumed constant pixel time $\tau_P$, to the determined pixel values with a low error, the RICS evaluation is carried out according to the invention only in a limited middle X-region in which the pixel time $\tau_P$ changes by less than 10%. In alternative embodiment forms, the data can also be analyzed with model functions adapted to the changing pixel time $\tau_P$ in the regions with greater deflections. In a particular, more advanced embodiment form of the data acquisition (not shown), the evaluating circuit 28, for example, only generates sampling values while the scanning beam is in the middle X region. This reduces the occurring data and the quantity of data to be stored.

Figure 4:
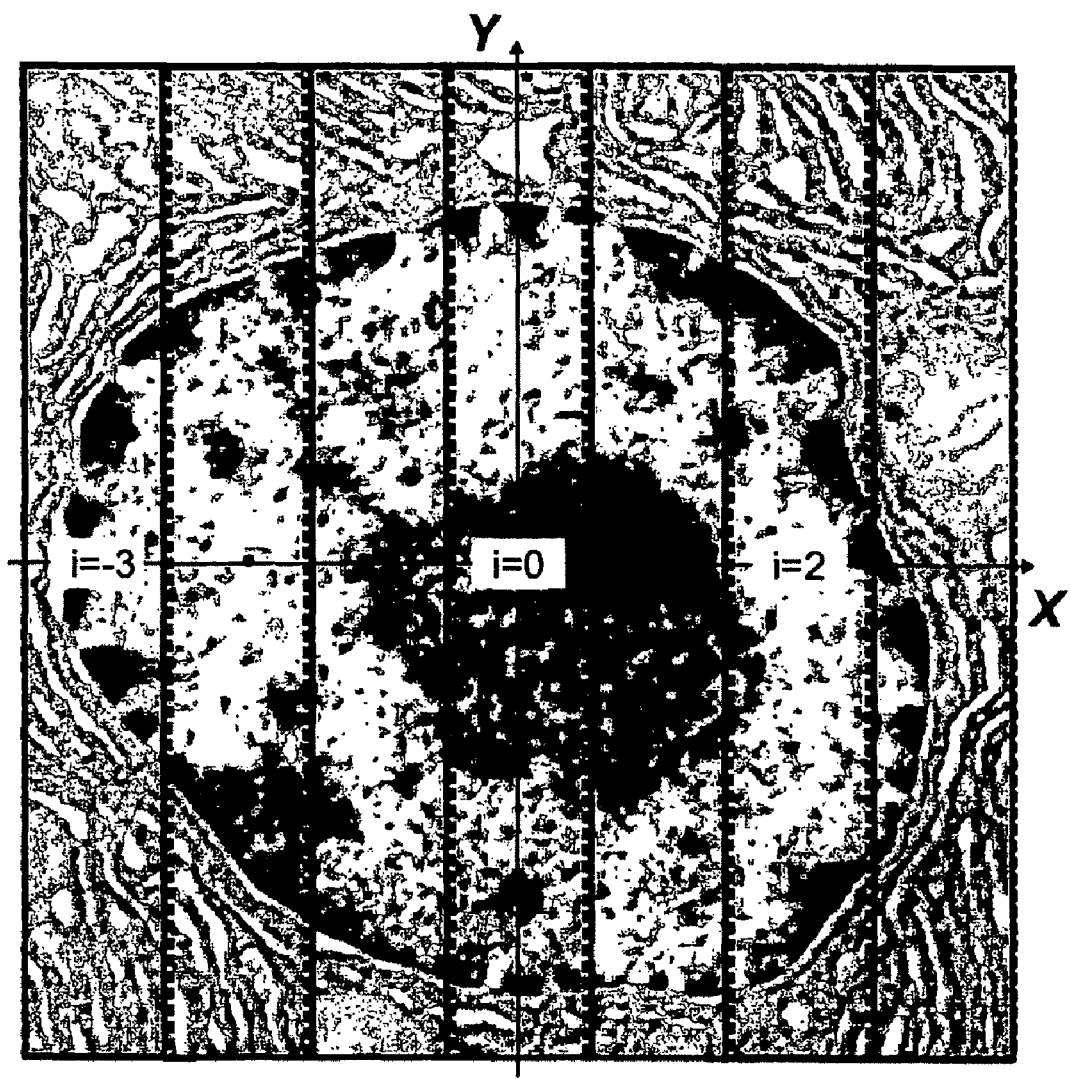
FIG. 4 the division of the sample region to be scanned into portions with virtually constant pixel time.

The data acquisition according to FIG. 4 is not limited in such a way. Rather, the sample is divided into a plurality of regions i=0 . . . 3 which are associated with different individual correlations $G_i$. The pixel time $\tau_{P,i}$ changes within each region by no more than 10% in each instance. Accordingly, an approximately piecewise linearity of the scanning movement is assumed. The mean pixel time $\tau_{P,i}$ for the RICS evaluation is stored for each region.

Before scanning the sample 16 for an actual RICS evaluation, best values can be determined for individually selectable scan parameters and suggested on the display by means of the control unit 29 at the request of a user. This is possible regardless of the type of scanning movement (harmonic, triangular, etc.). The user is then afforded the opportunity by means of the operating controls to accept the suggested scan parameters for a subsequent scanning process or to modify them beforehand. Alternatively, the scan parameters can be optimized in an obligatory manner preferably after the start of an actual RICS measurement as part of the measurement process prior to the actual scan without the user being informed of this. This also allows users who do not possess detailed knowledge of the optical and electronic scanning process to determine model parameters of transport processes with low errors by means of RICS measurements and RICS evaluations. By the same action, it is conceivable that a particularly qualified operator carries out an optimization of selected scan parameters, or of all scan parameters, according to the invention outside of regular operation and specifies the best values found in this way, or a value of a best value interval found in this way, for subsequent RICS measurements and RICS evaluations in regular operation which are carried out by less qualified users. Best values can be determined, for example, for the mutually interacting scan parameters of spatial increment $\delta r$ and pixel time $\tau_P$.

A best value for a scan parameter can be determined in a purely computational manner on the one hand and, on the other hand, by a quantity of empirical test scans with varying scan parameters. For example, a best value for the spatial increment $\delta r$ can be determined purely computationally from the objective lens parameters and a light wavelength to be used in a subsequent scan. The best pixel time $\tau_P$ and the best line time $\tau_L$ can be determined, for example, purely through real test scans, each with a different value for times $\tau_P$, $\tau_L$. Combined forms are also conceivable, for example, the partially computational determination of the best value for the spatial increment $\delta r$ and the partially empirical determination for pixel time $\tau_P$, while the line tie $\tau_L$ is not optimized but, rather, is left to the user to adjust as desired.

Instead of real test scans (test measurements) in combination with a variation of at least one scan parameter, the best value can be determined through purely computational simulations based on dynamic models. This is indicated, for example, in order to minimize the light energy stored in the sample when the sample reacts phototoxically and there is sufficient information about the dynamic transport process for modeling.

It is also possible to carry out an artificial variation of at least one scan parameter based on one or more real test scans. This may be regarded as a virtual test scan. For example, a real scan parameter such as the pixel time $\tau_P$ can be modified by collecting or omitting different quantities of sampling values of a real test scan.

The control unit (not shown) can provide a user interface for purely computational simulation of virtual test scans as well as for virtual test scans based on one or more real test measurements. The determined best values are then given automatically or on demand for a subsequent RICS measurement and RICS evaluation.

A best value can be determined from a plurality of test scans, regardless of whether they are real or virtual, in that the RICS correlations and, after adapting a model function through curve fitting, a minimum of an error of a target quantity characterizing a dynamic of a sample process, for example, a diffusion constant, are determined from the sampling values of the test scans. This can be carried out, for example, by a bisection method, known per se, until a minimum of the target quantity error is found.

Figure 5A:
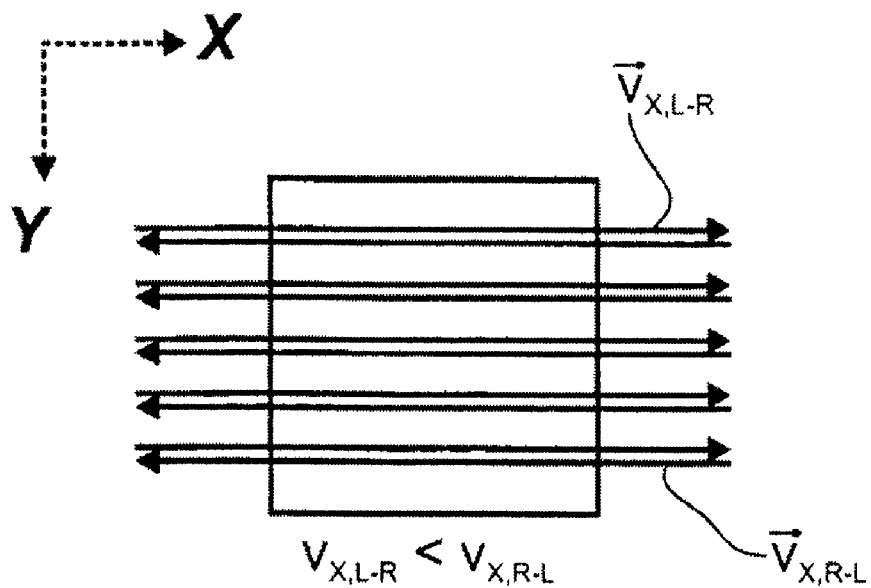
FIG. 5 scanning with different scan speeds in forward direction and return direction.
Figure 5B:
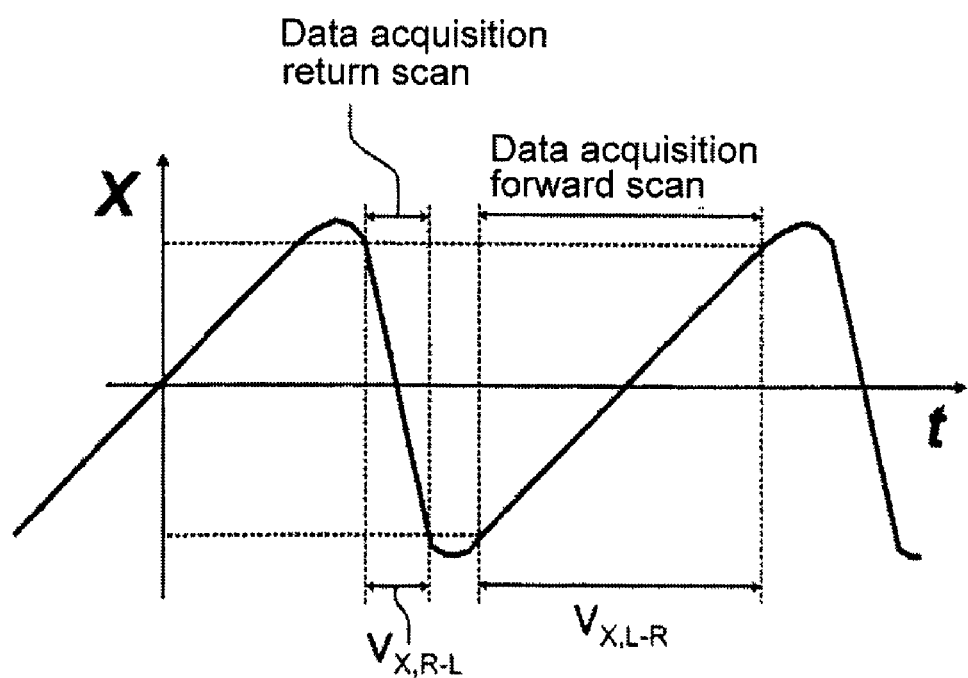

FIG. 5 shows the solution according to the invention for accelerating the configuration process in a scan with an approximately triangular curve. However, the solution is also applicable with harmonic movement. The scanning of the sample in a real test scan is carried out bidirectionally. In so doing, the control unit 29 adjusts a first scan speed $V_{X,L-R}$ of the beam-deflecting unit 9 from left to right in the forward scan and a second scan speed $V_{X,R-L}$ of the beam-deflecting unit 9 from right to left in the return scan. This gives a pixel time $\tau_{P,L-R}$ in the forward scan direction that is different from that $\tau_{P,R-L}$ in the return scan direction. In so doing, the data acquisition, for example, only takes place in two regions in which the pixel times $\tau_{P,R-L}$ and $\tau_{P,R-L}$ are approximately constant. In an alternative embodiment (not shown), the data acquisition can be carried out over the entire scan amplitude, wherein only sampling values from the two regions with approximately constant pixel time $\tau_{P,L-R}$ and $\tau_{P,R-L}$ are used for the evaluation. In both alternatives, the data of the two scan directions are processed separately to form pixel values (image data) and are analyzed separately with respect to the optimization of the scan parameters. By varying the pixel time $\tau_P$ between a plurality of complete test scans of the sample region to be scanned, the best value can be determined based on that pixel time $\tau_P$ in which the error of the target quantity parameter is minimal after correlation, adaptation of the model function and error determination of the target quantity parameter.

Figure 6:
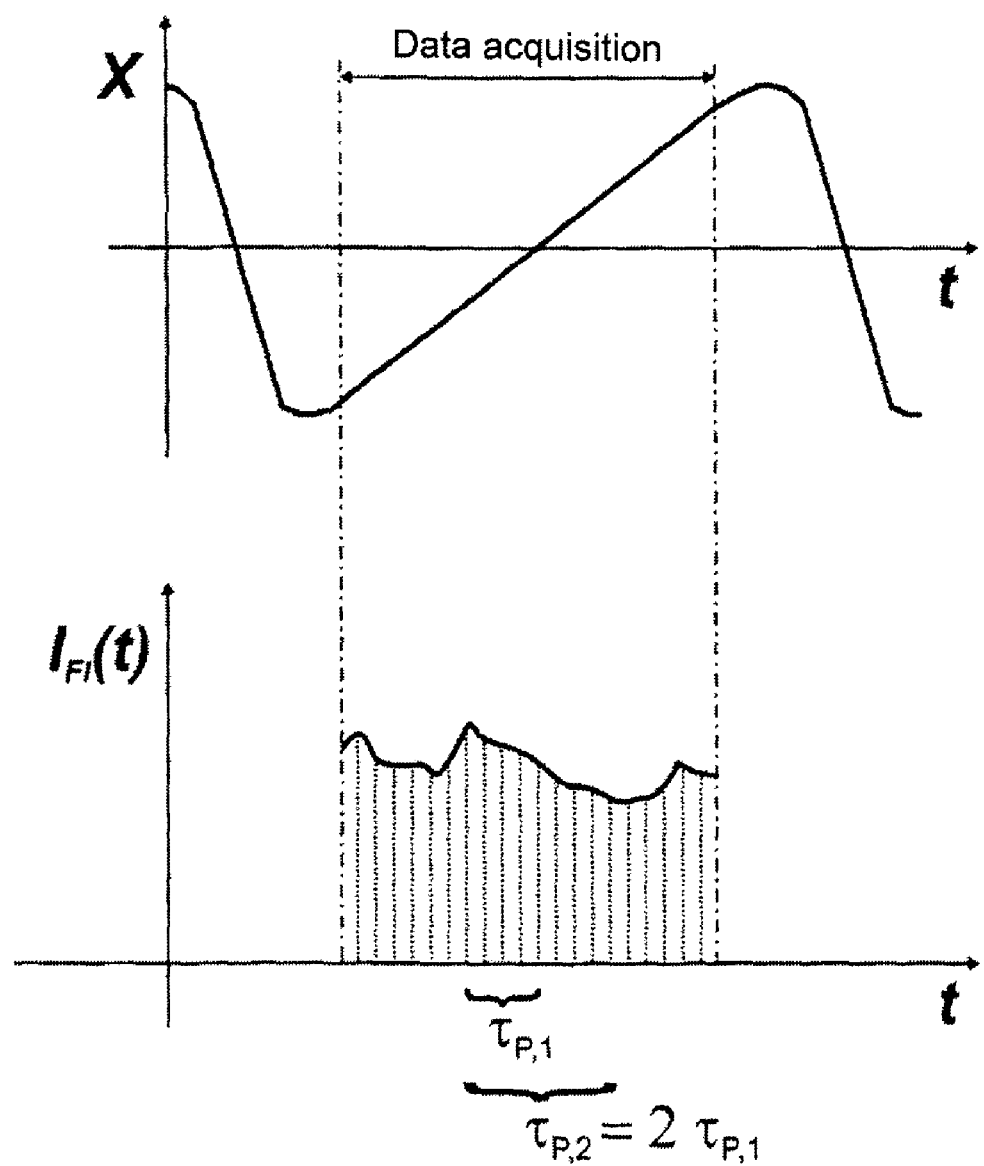
FIG. 6 the variation of the quantity of sampling values.

FIG. 6 shows an embodiment form in which, instead of the change in the scan speed $v_X$, the pixel time $\tau_P$ is varied in that the quantity of sampling values acquired during electronic oversampling or, more exactly, the averaged raw data of the evaluation circuit 28, is reduced. This can be carried out by collecting or omitting sampling values particularly at a constant sampling frequency of the evaluating circuit 28. As a result, the quantity of pixels available for correlations is reduced, which requires a corresponding change in the effective spatial increment $\delta r$ of the virtual test scans. For example, the spatial increment $\delta r$ must be increased when the pixel time $\tau_P$ is increased, for example, when the quantity of sampling values per pixel is increased.

The sampling frequency is a constant 40 MHz, for example. The scan speed $V_{X(L-R/R-L)}$ is adjusted by the control unit 29 in such a way that an electronic oversampling is carried out. Through different variants of reduction in quantity, virtual scan tests can be carried out with different pixel times $\tau_{P,k}$ to determine the best value. For example, a virtual pixel time $\tau_{P,2}$ can be determined virtually from a pixel time $\tau_{P,1}$ in that every two adjacent sampling values are averaged together. The pixel time $\tau_{P,2}$ is then twice as large as $\tau_{P,1}$. The reduction in the quantity of sampling values can advantageously be used in connection with optical oversampling because the exponential factor can be kept virtually constant.

In alternative embodiments (not shown), the sampling frequency can also be varied as scan parameter.

Figure 7:
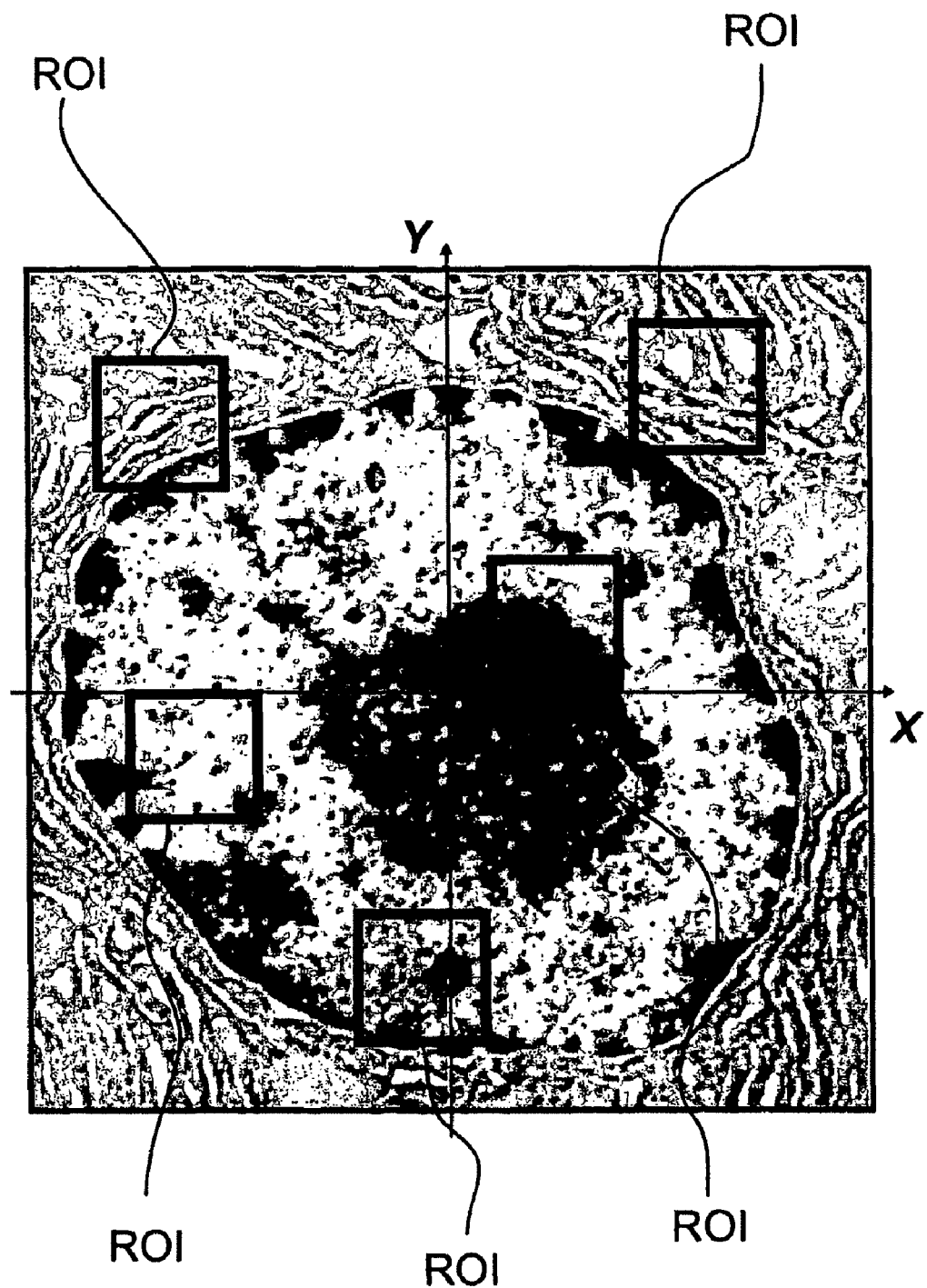
FIG. 7 the selection of regions of interest.

FIG. 7 shows a plurality of regions of interest ROI which have been selected graphically by a user based on an overview image of the sample. The processes of configuration, acquisition and evaluation according to the invention can be carried out separately in every region of interest and independent from the other regions of interest. Cross-correlations between the regions are also possible in the RICS evaluation.

FIG. 8 shows schematically in a flow chart the steps of a process according to the invention which includes the configuration of the laser scanning microscope and the data acquisition and data evaluation for determining diffusion constants $D_i$ in different regions i of interest. The fast scan axis X is harmonically controlled, for example, and the slow scan axis is linear.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 1 first laser module
2, 3, 4 lasers
5 beam combiner
6 AOTF
7 light-conducting fiber
8 scanning device
9 beam-deflecting unit
10 second laser module
11 AOTF
12 light-conducting fiber
13 collimating optics
14 scanning objective
15 microscope
16 sample
17 tube lens
18 beamsplitter
19 microscope objective
20 beamsplitter
21 imaging optics
22 detection channel
23 photomultiplier
24 deflecting prism
25 beamsplitter
26 pinholes
27 emission filter
28 evaluating circuit
29 control unit
30 beamsplitter
31 optoelectronic receiver
32 line filter
33 neutral filter
$V_{X,L-R}$ forward scan speed
$V_{X,R-L}$ return scan speed
$\phi$ deflection angle
X, Y deflection, scan axes
$\Delta t$ time increment
$\delta r$ spatial increment
$\tau_P$ pixel time
ROI region of interest
i number of the region of interest
G, $G_i$ correlation
F model function
D diffusion constant

The invention claimed is:

1. A method for configuring a laser scanning microscope for a raster image correlation spectroscopy measurement, comprising the steps of:
   determining a best value for a scan parameter of the laser scanning microscope, and
   configuring the laser scanning microscope so as to specify the best value for a subsequent scan process on a sample;
   wherein the best value is determined by performing at least one of (1) a simulation of a transport process in the sample and (2) a virtual test scan.

2. The method according to claim 1;
   wherein one or more of the following quantities is used as scan parameter: spatial increment, scan speed (vX), pixel time ($\tau$P), line time, sampling frequency.

3. The method according to claim 2;
   wherein the best value of the spatial increment is determined on the basis of a width of a point transfer function of the laser scanning microscope in such a way that the spatial increment is significantly less than the width of the point transfer function.

4. The method according to claim 2;
   wherein the best value of the spatial increment is determined on the basis of at least one objective lens parameter and a light wavelength to be used in the subsequent scanning.

5. The method according to claim 1;
   wherein the best value is determined by performing a plurality of test scans of the sample to be scanned subsequently with a different test value for the scan parameter in each of the plurality of test scans.

6. The method according to claim 5;
   wherein the best value is determined by determining a minimum of an error of a quantity characterizing a dynamic of a sample process from the each of the plurality of different test values used for the scan parameter in each of the plurality of test scans.

7. The method according to claim 6;
   wherein a diffusion constant is used as a quantity characterizing the dynamic.

8. The method according to claim 5;
   wherein the best value is determined by determining a maximum of a width of a correlation of a test scan from the each of the plurality of different test values used for the scan parameter in each of the plurality of test scans.

9. The method according to claim 5;
   wherein the sample is scanned bidirectionally in each of the plurality of the test scans with a test value of the scan parameter to be optimized, wherein the test value differs in the forward direction and return direction.

10. The method according to claim 9;
    wherein the bidirectional scanning is performed in the forward direction and the return direction within the same scan line.

11. The method according to claim 10;
    wherein a plurality of sampling values are collected or omitted to vary the quantity of sampling values.

12. The method according to claim 1;
    wherein a real electronic oversampling is carried out, and at least one virtual test scan is carried out based on the oversampling wherein the quantity of real sampling values for the virtual scan is varied computationally.

13. The method according to claim 1;
    wherein the sample region to be scanned is determined based on a user's geometric presets.

14. The method according to claim 1;
    wherein the best value is determined exclusively for, and exclusively on the basis of sampling values from the sample region to be scanned.

15. The method according to claim 1;
    wherein the best value is outputted as a suggestion, and a confirmation of a user for the optimized value is determined prior to a subsequent scan process.

16. A non-transitory computer-readable medium for storing a computer program for performing the method according to claim 1.

17. A method for carrying out a raster image correlation spectroscopy measurement of a sample, comprising the steps of:
    acquiring sampling values by means of a laser scanning microscope;
    wherein the sampling values are acquired exclusively in a sample region within which a pixel time changes along a harmonically controlled scan axis by less than, or at most by, a predetermined or predeterminable value.

18. The method according to claim 17;
wherein sampling values are determined exclusively in a plurality of scan regions within which the pixel time changes along the harmonically controlled scan axis by less than, or at most by, a predetermined or predeterminable value.

19. The method according to claim 17;
wherein the sample is optically or electronically oversampled.

20. A control unit for a laser scanning microscope which is programmed to carry out a method according to claim 17.

21. A laser scanning microscope with a control unit according to claim 20.

22. A non-transitory computer-readable medium for storing a computer program for performing the according to claim 17.

23. A method for evaluating sampling values of a raster image correlation spectroscopy measurement of a sample, comprising the steps of:
determining a correlation by means of a control unit of a laser scanning microscope from sampling values of a raster image correlation spectroscopy measurement;
wherein the correlation is determined exclusively in a sample region within which a pixel time changes along a harmonically controlled scan axis by less than, or at most by, a predetermined or predeterminable value.

24. The method according to claim 23;
wherein separate correlations are determined in a plurality of scan regions within which the pixel time changes along the harmonically controlled scan axis by less than, or at most by, a predetermined or predeterminable value.

25. The method according to claim 23;
wherein the quantity of sampling values is changed by collecting or omitting for determining the correlation.

26. A control unit for a laser scanning microscope which is programmed to carry out a method according to claim 1.

27. A laser scanning microscope with a control unit according to claim 26.

28. A control unit for a laser scanning microscope which is programmed to carry out a method according to claim 23.

29. A laser scanning microscope with a control unit according to claim 28.

30. A non-transitory computer-readable medium for storing a computer program for performing the method according to claim 23.

* * * * *